Figure 4:
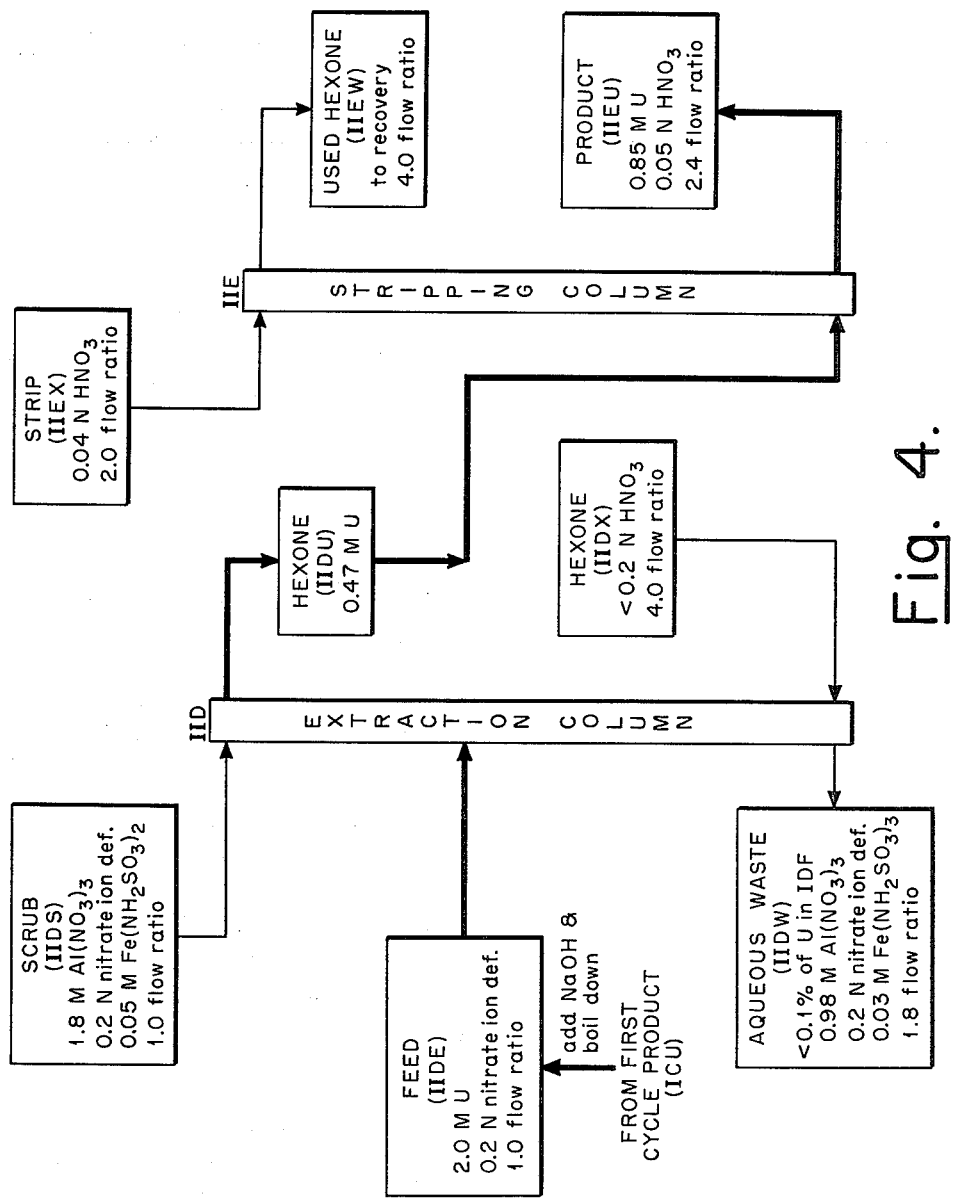

July 24, 1962
F. R. BRUCE
3,046,087
SOLVENT EXTRACTION PROCESS FOR SEPARATING URANIUM
AND PLUTONIUM FROM AQUEOUS ACIDIC SOLUTIONS
OF NEUTRON IRRADIATED URANIUM
Filed Jan. 13, 1956
5 Sheets-Sheet 1
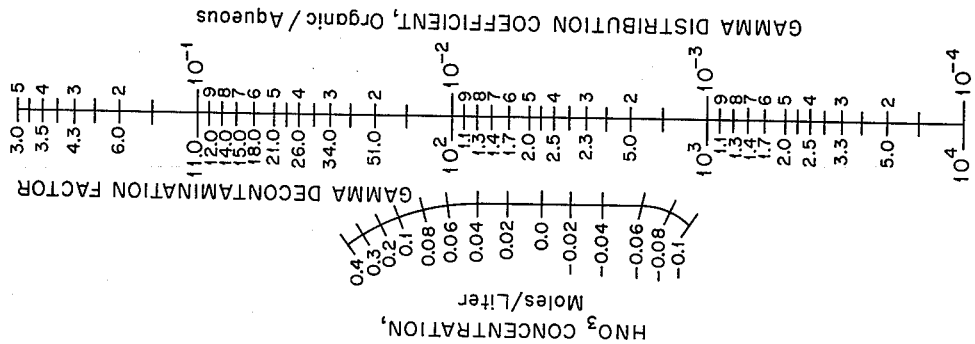
Fig. 2.
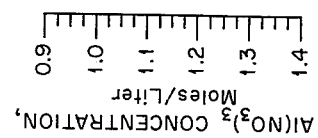
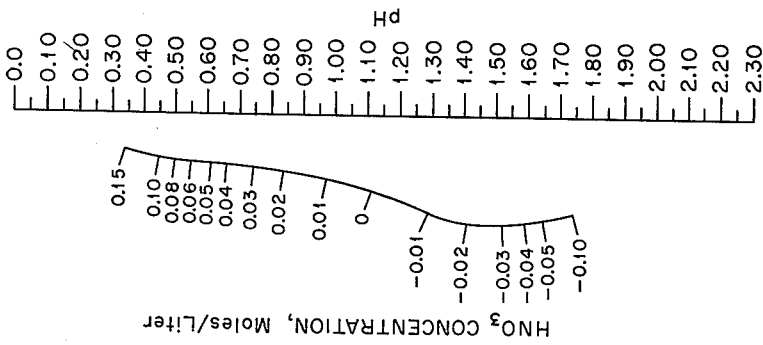
Fig. 1.
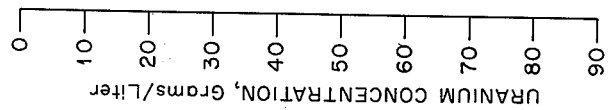
INVENTOR.
BY Francis R. Bruce
ATTORNEY

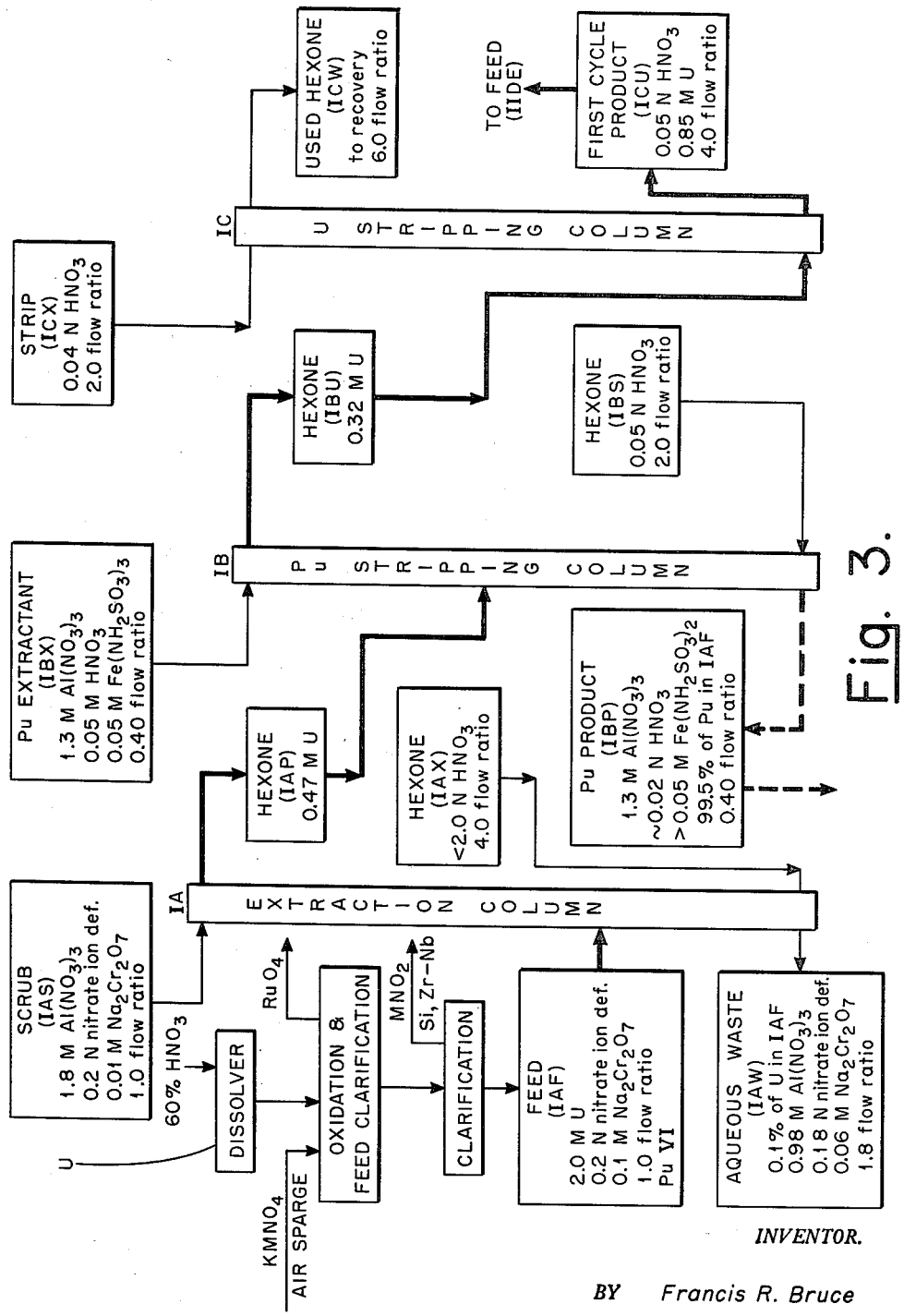

INVENTOR.
BY Francis R. Bruce
ATTORNEY

INVENTOR.
BY Francis R. Bruce
ATTORNEY

INVENTOR.
BY Francis R. Bruce
ATTORNEY 3,046,087
SOLVENT EXTRACTION PROCESS FOR SEPARATING URANIUM AND PLUTONIUM FROM AQUEOUS ACIDIC SOLUTIONS OF NEUTRON IRRADIATED URANIUM
Francis R. Bruce, Oak Ridge, Tenn., assignor to the United States of America as represented by the United States Atomic Energy Commission
Filed Jan. 13, 1956, Ser. No. 559,080
6 Claims. (Cl. 23—14.5)

My invention relates to an improved process for the decontamination of a neutron-irradiated fissionable and fertile material and more particularly to an improved solvent extraction process for such decontamination.

In utilizing uranium and plutonium as fuels in nuclear reactors, they would ideally be left in the reactor until substantially all the fissionable material has been consumed by fission. In practice, however, the fuel is withdrawn from the reactor for decontamination from fission products long before it has been totally consumed. For example, uranium having the natural isotopic concentration may be withdrawn from a reactor after the concentration of uranium-235 has been reduced from an initial 0.71% to only approximately 0.64%. This is done to prevent the accumulation of excessive quantities of fission products having large neutron absorption cross-sections. An extremely small amount of such fission products has a highly deleterious effect on the reactivity of the reactor and may even threaten the continuance of the chain reaction. Furthermore, when the reactor is employed to produce uranium-233 or plutonium as a primary product, the new fissionable species must be removed before they are permitted to concentrate to a point at which they undergo fission at an uneconomically rapid rate relative to the production thereof, with a resulting decrease in yield. Since the fissionable material remaining in the spent fuel element constitutes a significant and valuable quantity that may be re-used directly as a reactor fuel, reactor design permitting, or further concentrated by such isotopic separation means as gaseous diffusion, the economical recovery and decontamination of such fuel is of supreme importance in the development of an atomic energy program.

The processing of reactor fuel differs from most chemical processing principally in that minor quantities of fission products must be separated from large quantities of substantially unchanged material. The chemical processing associated with the operation of nuclear reactors, therefore, generally has three primary objectives: removal of fission product poisons from the remaining fuel; the reclamation of the fuel; and the recovery of uranium-233 or plutonium when desired.

For general information concerning the processing of nuclear reactor fuel, reference is made to Glasstone, Principles of Nuclear Reactor Engineering, especially to Chapter 7 and pages 416-428.

Prior art solvent extraction processes, commonly conducted in aqueous nitric acid systems, employed strongly acidic conditions, say in the order of two normal nitric acid. While uranium recoveries were satisfactory, decontamination from fission products generally, and particularly ruthenium, left much to be desired. As Glasstone states on page 296 of the cited work, ruthenium is easily considered the most difficult element to separate from the desired products in fuel processing. The reason is that, in addition to having amphoteric properties, it exhibits several, possibly six, oxidation states. In view of this, and the tendency of ruthenium to exist in various forms of molecular association, such as in colloids and polymers, it has heretofore been extremely difficult to confine ruthenium to a single phase during solvent extraction and maintain a single, reproducable distribution co-efficient between organic and aqueous phases. Thus, decontamination with respect to ruthenium has proven to be the limiting factor in the decontamination of neutron-irradiated fissionable material. For example, approximately 75-90% of the remaining beta activity after the first cycle of a prior art solvent extraction process was due to ruthenium.

To improve ruthenium decontamination, special pretreatments (prior to solvent extraction processing) have been devised. In one method, described in the co-pending application of the common assignee S. N. 561,962 filed January 27, 1956, in the name of Allan T. Gresky for "Improved Ruthenium Decontamination Method," now U.S. Patent No. 2,945,740 issued July 19, 1960, the solution is subjected to treatment with acetone and sodium nitrite prior to processing. However, such methods are time consuming and burdensome, and since they are essentially unit operations, they slow down and impede continuous chemical processing of reactor fuels.

The term "fissionable material" as used herein refers to uranium-235, uranium-233 and plutonium, and the term "fertile material" refers to thorium and uranium-238. The term "fission" refers to the splitting of uranium and plutonium into a plurality of parts upon the capture of a neutron of appropriate energy, and the term "fission products" refers to the immediate product nuclei from fission as well as to their radioactive decay products. (See Glasstone, op. cit., especially pages 105-128.) The closely similar statistical fission product yields of U-233, U-235 and Pu-239 are shown in Stevenson, Introduction to Nuclear Engineering, page 50. Glasstone, op. cit., pages 389-397, indicates the fission product species of major importance in fuel reprocessing after different lengths of radioactive decay.

In view of the difficulties experienced by the prior art in solvent extraction decontamination of fissionable material, particularly in decontamination with regard to ruthenium, it is an object of my invention to provide an improved method for the recovery and decontamination of neutron-irradiated fissionable and fertile material.

Another object is to provide an improved method for the decontamination of fissionable and fertile material by solvent extraction.

Another object is to provide such an improved method in which decontamination from fission products, particularly ruthenium, is greatly improved, while yet not diminishing fissionable material recovery.

Still another object is to provide an improved continuous solvent extraction process for such fuel recovery and decontamination, wherein decontamination with regard to ruthenium is vastly improved without an interposed special unit operation.

Yet another object is to provide such a process which displays a high degree of mechanical operability and flexibility and which is capable of remote control operation.

These and other objects and advantages of my invention will become apparent from the following detailed description, the accompanying drawings and the attached claims.

In accordance with my present invention I have provided, in a solvent extraction process for decontaminating neutron-irradiated fissionable and fertile metals which includes the selective extraction of at least one fissionable or fertile metal from an aqueous mineral acid solution with a substantially water-immiscible organic solvent, the improvement which comprises conducting said extraction under conditions of a net deficiency of total acid-forming anions, i.e., a slight stoichiometric deficiency of inorganic anions other than hydroxyl. Since solvent extraction processes are generally conducted in nitric acid solutions, this amounts to a nitrate ion deficiency. For convenience in presentation, my invention will, therefore, hereinafter be illustrated specifically with regard to nitrate ion deficient solvent extraction conditions.

The employment of my invention vastly improves decontamination with regard to fission products in solvent extraction processing of reactor fuel. For example, ruthenium decontamination factors under my nitrate ion deficient conditions are commonly $10^3$ as compared to with only 5 or 6 using acid flowsheets. Total fissionable material beta decontamination is commonly $6 \times 10^5$ as compared with $2 \times 10^3$ with an acid flowsheet, and total gamma decontamination is similarly spectacular—$4 \times 10^5$ as compared with $1 \times 10^3$. My conditions surprisingly do not effect plutonium and uranium recovery, contrary to what might be expected; plutonium and uranium recovery of 99.9% is generally obtainable. No special unit-operation preceding solvent extraction is necessary, and fully continuous chemical processing is practical. My nitrate ion deficient extraction conditions are not limited in applicability to any single flowsheet or combination of flowsheets or to the recovery of any single isotope of uranium or plutonium. Furthermore, in processes for recovering the neutron-irradiated fertile material, thorium, my method likewise aids in its recovery together with that of the fissionable material which is bred from it, uranium-233. My method has been very successfully employed as a principal feature in a number of current large scale production processes for the recovery of fissionable and fertile material. Having been so successfully demonstrated to date, it shows further promise of improving reactor fuel recovery, thereby directly contributing to the advancement of economical nuclear power.

As understood in this specification and in the appended claims, nitrate ion deficiency is a relative term to denote the condition of a solution in which more equivalents of total metal ions, usually weakly basic, are present than equivalents of nitrate ions. Thus, such a solution of a nitrate salt of a given molarity will not register as high an acidity as a solution of the normal nitrate salt of the same metal molarity, or in other words, this is a measure of a stoichiometric deficiency of nitrate ions. This stoichiometric deficiency is cured through addition of hydroxyl ion by hydrolysis or direct base addition, rather than by direct addition of other anions such as sulfate; in this regard nitrate ion deficiency should be understood to reflect the total anion (other than hydroxyl) deficiency of the system. Hence, when it is said that a solution of weakly basic or amphoteric cations is 0.1 normal nitrate ion-deficient, it is understood that the solution contains that much less nitrate ion than the solution of the normal nitrate salt of the same metal, regardless of the metal molarity of the solution; that is, a one molar uranyl nitrate solution and a three molar uranyl nitrate solution may each be 0.1 normal nitrate ion deficient, since both solutions lack just that amount of nitrate ion to meet stoichiometric requirements. However, the acidities of the solutions will not be the same in view of the different salt concentrations.

Nitrate ion deficient uranium, thorium and aluminum solutions (aluminum nitrate is commonly used as a salting agent in solvent extraction, as will be shown below), may be conveniently achieved by dissolving additional uranium, thorium or aluminum metal in aqueous solutions of the normal salt, by boiling off nitric acid as nitrogen oxides, or in the case of aluminum, by directly employing a basic salt such as aluminum hydroxy or dihydroxy nitrate. This result may also be brought about by direct addition of a base, such as sodium or preferably ammonium hydroxide.

Although the chemistry of nitrate ion deficient solution is not completely known, and I do not wish to be bound to any particular theory, an attempt will be made to explain how nitrate ion deficiency is obtained and its effects on decontamination from fission products. As an example, consider an aluminum nitrate solution that is nitrate ion deficient. Stoichiometric amounts of aluminum and nitric acid are contacted to form aluminum nitrate, or aluminum nitrate itself is employed. When additional amounts of aluminum are added to such a solution the water reacts with aluminum ions to form aluminum hydroxide. The aluminum hydroxide may then exchange ions with the aluminum nitrate present, resulting in the formation of aluminum hydroxy or dihydroxy nitrates $[Al(OH)(NO_3)_2$ and $Al(OH)_2NO_3]$. If too much aluminum is added, insoluble $Al(OH)_3$ is formed. Similarly, hydroxy uranyl nitrate salts may be formed. The hydrolysis of these weakly acidic salts will then supply hydrogen ions to the solution which gives the solution an acidic pH. (Of course, the same hydrolysis mechanism applies if preformed basic aluminum or uranium nitrate salts are used.) Thus, in nitrate ion deficient systems, the hydrogen ions are supplied to the solution from the hydrolysis of weakly acidic salts rather than directly from the introduction of nitric acid. Generally, I find that an aqueous nitrate ion solution of fissionable (or fertile) material of approximately 0.05–0.5 normal nitrate ion deficiency is satisfactory, while about 0.3 normal nitrate ion deficiency is preferred. It is appreciated that with extreme nitrate ion removal, hydrolysis effects will continue until the solution becomes basic and uranium, aluminum and other precipitations occur.

In FIG. 1 is shown a nomogram of an aqueous uranyl nitrate solution, which correlates uranium molarity and nitrate ion deficiency to pH. On this scale negative values refer to nitrate ion deficiency, the 0 point represents stoichiometric equivalency, and the positive values indicate the amount of free acid. To find the third parameter when two are given, draw a line connecting the two given points and extend it, if necessary, to give the third reading.

In addition to formulating nomograms such as in FIG. 1, the nitrate ion deficiency of my reactor fuel solutions may be analytically determined. Although the exact analytical technique employed is not critical, the following is one suitable method. It involves titration with standardized alkali, after complexing polyvalent metal ions with oxalate. The reagents are saturated potassium oxalate solution, 0.1 N NaOH standardized against potassium acid phthalate and 0.1 N HCl standardized against the foregoing NaOH. An aliquot of sample is pipetted into a titration vessel and a small magnetic stirring bar is placed in the vessel. If less than 5 ml. of a 0.1 N NaOH solution would be required to neutralize the estimated acidity of the sample, pipette an HCl spike into the titration vessel. Next, pipette 10 ml. of the potassium oxalate solution into the vessel, buffer a Beckman automatic titrator, set the pH dial to read 7.0 and titrate with the NaOH. The calculation to give the total milli equivalents of nitrate ion deficiency in the sample is:

(ml. of base $\times$ N of base) $-$ (ml. of spike $\times$ N of spike)

It should be noted here that in extraction both feed and scrub solutions need not be nitrate ion deficient, provided the net extraction conditions are nitrate ion deficient. Thus, either the feed or scrub solution may be acid, as long as the other solution is sufficiently nitrate ion deficient to overcome it and give the required net nitrate ion deficiency. Generally, however, both nitrate ion deficient feed and scrub conditions are preferred.

The choice of the organic solvent for extracting the fertile and/or fissionable material from my nitrate ion deficient aqueous feed solutions, while suppressing fission products extraction, is subject to considerable variation. The choice depends upon the selectivity of the solvent for the desired products, the ease with which products can be stripped from the organic material after the primary extraction, chemical and radiation stability of the solvent, immiscibility of the organic-aqueous mixture, specific gravity of the organic as compared with the aqueous solution and viscosity. Among the satisfactory solvents are ethyl ether, penta ether, and diiosopropyl carbinol. For most purposes, however, hexone (methyl isobutyl ketone) and tri-n-butyl phosphate (hereinafter called "TBP") are particularly satisfactory. Hexone may be used without any diluent, while TBP should be diluted with an inert, saturated hydrocarbon diluent, preferably a kerosene fraction. Paraffinic kerosene fractions are preferred.

The contacting of the nitrate ion-deficient solution of neutron irradiated fissionable and fertile material with the organic extractant may be performed in various manner. For example, it may be performed batchwise in separatory funnels or in mixer-settlers. In column operation, packed, perforated-plate, pulse columns or the like may be used. Continuous column operation is naturally preferred for large scale operation. Since countercurrent operation provides for most efficient mixing, the aqueous, nitrate ion deficient feed solution is introduced about the middle of the column, and the organic extractant is introduced at the bottom (assuming the organic phase has a specific gravity less than one; otherwise the points of introduction are inverted). At the top of the column, where the organic phase is withdrawn, it is highly beneficial to scrub any extracted fission products from the organic phase with an aqueous scrub solution of a nitrate ion deficient scrub solution, of about the same nitrate ion deficiency as the feed solution. While various inorganic nitrate salts may be used, aluminum nitrate is especially noteworthy, because of its efficient salting action, the ease in which nitrate ion deficient solutions may be obtained, and because aluminum, which is a common jacketing material for uranium reactor fuel, may already be conveniently present in the feed solution. If natural uranium or only slightly enriched uranium is being processed, such that considerable plutonium may be present and its recovery desirable, this may be accomplished by oxidizing the plutonium to the hexavalent stage to promote its extraction by the organic phase. Then, in a second column the uranium and plutonium may be separated in the organic extract by preferentially reducing the plutonium to the tri-positive state, such that it may be stripped from the organic phase with an aqueous stripping solution. The uranium, which then remains in the organic phase, may be introduced into a third column where it may be stripped with an aqueous solution under the proper conditions. In the event that plutonium recovery is not desired or if highly enriched uranium-235 is being processed, such that little plutonium is present, then the uranium may be simply stripped from the original organic extract in a two-column operation. If higher decontamination rates are required, separate second or third-cycle plutonium and/or uranium extraction cycles may be performed in the manner of the first cycle extraction and stripping columns.

With this background of column operation, a general description will now be given of three different, specific, solvent extraction processes particularly developed about my nitrate ion deficient feed conditions. The first is a process for the recovery and decontamination of uranium and plutonium from natural or slightly enriched uranium. The second is a process for the recovery of highly enriched uranium. The third is a process for the separation of protactinium, thorium and uranium-233 from neutron-irradiated thorium. More detailed description of these processes will be found in the specific examples, but the process outlines will be given here in order to illustrate the versatility of nitrate ion deficient extraction conditions in processing varying types of reactor fuels and fertile materials. In the first process, both uranium and plutonium are extracted by hexone from aqueous nitrate solution, while fission products are only very slightly extracted. At the nitrate ion deficient condition required for best decontamination and also for solvent stability, Pu (IV) may hydrolize to the non-extractable polymeric form, and in addition is not extracted as well as Pu (VI); extraction of plutonium is therefore preceded by oxidation of plutonium to the VI state with alkali dichromate at elevated temperature. The feed solution is adjusted to approximately 1–4 molar uranyl nitrate and 0.1–0.5 normal nitrate ion deficiency, and is made approximately 0.025–0.5 molar in dichromate to oxidize the plutonium. In the extraction column, both uranium and plutonium are extracted with hexone while confining fission products to the aqueous phase, and the organic phase is scrubbed in the same column with an aqueous aluminum nitrate solution of approximately the same nitrate ion deficiency as the feed solution and containing a slight amount of dichromate, less than approximately 0.1 molar. In the second column the plutonium is stripped from the organic phase with approximately 0.01–0.2 molar ferrous sulfamate, which reduces plutonium to the inextractable III state without effecting the uranium. To prevent uranium stripping, the aqueous stripping solution is made approximately 0.5–3.0 molar in aluminum nitrate. This aqueous solution is scrubbed with additional, slightly acidified hexone before being withdrawn from the bottom of the column. The uranium is then stripped from the organic phase in the third column with slightly acidified water, say 0.01–0.15 molar in nitric acid.

At higher radiation levels, it may be desired to put the uranium product stream, and possibly the plutonium product stream through several additional solvent extraction cycles. The uranium product stream from the first cycle, which may be less than one molar in uranium, is evaporated to approximately 1.5–3.5 molar uranyl nitrate and 0.1–0.5 normal nitrate ion deficiency, and is put through a second uranium cycle which is nearly identical with the first cycle except that plutonium is not significantly present and the uranium is stripped from the organic extract in the second column and the aqueous scrub solution is approximately 0.02–0.2 molar in the reductant, ferrous sulfamate, and has no oxidant, in order to purify the uranium with regard any trace amounts of plutonium.

If additional plutonium decontamination is required, the plutonium product stream from the first cycle, already salted with aluminum nitrate, is oxidized with dichromate and then decontamined by at least a second solvent extraction cycle similar to the first except that no significant amount of uranium is present. The plutonium is extracted with slightly acidified hexone, is scrubbed with a nitrate ion deficient aluminum nitrate solution provided with dichromate, and then is stripped with dilute nitric acid in a second column. Ferrous sulfamate is not required in the scrub stream, as in the first cycle partitioning column, where separation from uranium is accomplished. The plutonium solution from the strip column of the second cycle may then be salted with aluminum nitrate and put through a third cycle, similar to the second.

The process losses in this process for plutonium are less than 0.2%; uranium losses are less than 0.1%. The plutonium content of the uranium stream is approximately one part in $10^8$ parts of uranium after two cycles of extraction. Decontamination from fission products and ruthenium is extremely high, in the order of $10^5$.

The second solvent extraction process built upon my nitrate ion deficient feed conditions is for the recovery of uranium highly enriched in uranium-235. This process is similar to the previous process except that separation and decontamination of plutonium is not required since only small amounts of plutonium are produced in enriched uranium fuels. Any small amounts of plutonium in the feed stream follows fission products into the aqueous waste from the extraction column. Any aluminum present as a uranium diluent and cladding material in the fuel element diminishes the fresh aluminum requirement in the scrub solution and serves as a salting agent in the extraction step. The process essentially comprises the following steps: dissolution of uranium or uranium-aluminum alloy in 60% nitric acid with mercuric nitrate catalyst for aluminum dissolution (approximately 1%, by weight, of the aluminum); feed clarification by filtration; feed adjustment to approximately 0.5–3.0 molar aluminum nitrate, 0.05–0.5 normal nitrate ion deficiency; and separation of the uranium from fission products and any plutonium in at least one cycle of solvent extraction, using hexone as the solvent. Any trace amounts of plutonium are separated from the uranium in a second cycle after being reduced to the inextractable trivalent state with ferrous sulfamate which is added with the aqueous, nitrate ion deficient, aluminum scrub solution. The small quantities of plutonium are discarded with the fission products. Excellent uranium decontamination is achieved, with 99.9% recovery.

The third process developed about my nitrate ion deficient solution is for the separation of protactinium, thorium and uranium from neutron irradiated thorium, such as may be used in a breeder program for converting fertile thorium to fissionable uranium-233. For details concerning this process, reference is made to the co-pending application of the common assignee, S.N. 602,686, filed August 7, 1956, in the names of A. T. Gresky et al., for "Process for Separation of Protactinium, Thorium and Uranium from Neutron-Irradiated Thorium." Briefly, in this process an aqueous thorium nitrate solution of neutron-irradiated thorium is adjusted to feed conditions of approximately: 0.5–3.0 molar thorium nitrate, 0.25–1.5 molar aluminum nitrate and 0.1–0.6 normal nitrate ion deficiency. The aqueous feed is introduced near the middle of the extraction column, the extractant, approximately 42% TBP—58% Amsco 125–82 (an inert paraffinic, kerosene-type diluent), flows upwardly through the column and extracts the thorium and uranium-233. An aqueous solution of approximate composition 0.2–1.5 molar aluminum nitrate, 0.1–0.6 normal nitrate ion deficiency, 0.005–0.5 molar ferrous sulfate, and 0.001–0.010 molar phosphoric acid is introduced at the top of the column to scrub any extracted protactinium and fission products from the organic extract.

The aqueous phase from the extraction column, which is about 0.1–0.6 normal nitrate ion deficient, and contains the protactinium-233, fission products and other impurities is reduced in volume by evaporation to permit minimum storage volumes and/or the high aluminum nitrate concentrations that may be required for salting in subsequent protactinium-233 recovery cycles or for solvent extraction of the uranium-233 daughter.

The organic extract from the extraction column, containing thorium and uranium-233 is cascaded to the middle of a second, partitioning column. The thorium is stripped into an aqueous phase of approximately 0.05–0.5 normal nitric acid, and this aqueous solution is scrubbed by an organic stream of approximately 42% TBP—58% diluent fraction introduced at the bottom of the column. The organic effluent from the partitioning column, containing all the uranium-233 and having a nitric acid concentration of less than approximately 0.01 normal is passed to a third column where the uranium is stripped into very slightly acidified water. The uranium may be concentrated and further decontaminated from the aqueous product stream by an additional solvent extraction cycle or passage onto an organic cation exchange resin characterized by a plurality of nuclear sulfonic acid groups. The adsorbed uranium can be eluted from this resin with aqueous eluant.

The following examples are offered to illustrate the foregoing processes in more detail.

EXAMPLE I

This example is intended to show an actual production scale process for the separation and decontamination of uranium and plutonium from neutron-irradiated uranium. The procedure outlined on the flowsheets in FIGS. 3 and 4 was exactly followed. The main process flow is indicated by the heavy line. FIG. 3 shows the first cycle for the separation and decontamination of uranium and plutonium and FIG. 4 shows a second uranium cycle. A second plutonium cycle was conducted with the IBP stream as in the FIG. 3, except that uranium was not present.

Plutonium activity in the uranium product was reduced to approximately one part in $10^8$ parts of uranium after two cycles. The uranium recovery was over 99.9%.

Table I, below, shows the decontamination factors for uranium and plutonium achieved in two uranium and plutonium cycles of solvent extraction.

*Table I*

DECONTAMINATION FACTORS

| Constituent | log D.F. | | | |
|---|---|---|---|---|
| | 1st Cycle | | 2nd Cycle | |
| | U | Pu | U | Pu |
| Gross alpha | 3.7 | 3.9 | 1.8 | 2.9 |
| Gross beta | 3.9 | 4.3 | 1.8 | 2.9 |
| Ce | 7.0 | 6.5 | | |
| Nb | 4.3 | 4.0 | 6.3 | |
| Ru | 2.7 | 3.3 | 4.7 | 2.8 |
| Zr | 4.3 | 3.8 | 6.3 | 2.8 |

When the above process was run under acid conditions the ruthenium decontamination factor was several orders of magnitude less, and the total beta and total gamma decontamination factors were each two orders of magnitude less.

EXAMPLE II

Figure 5:
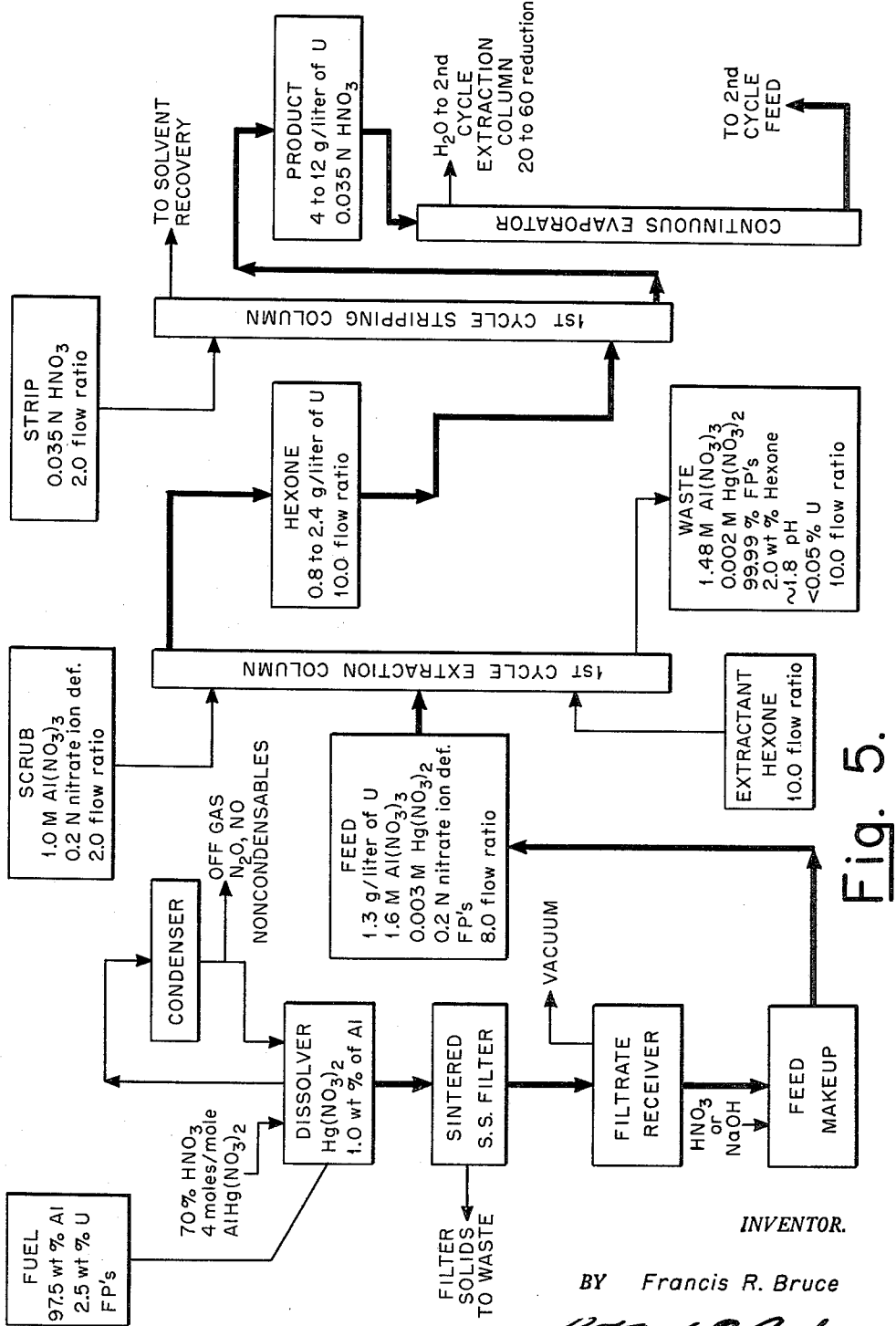
Figure 6:
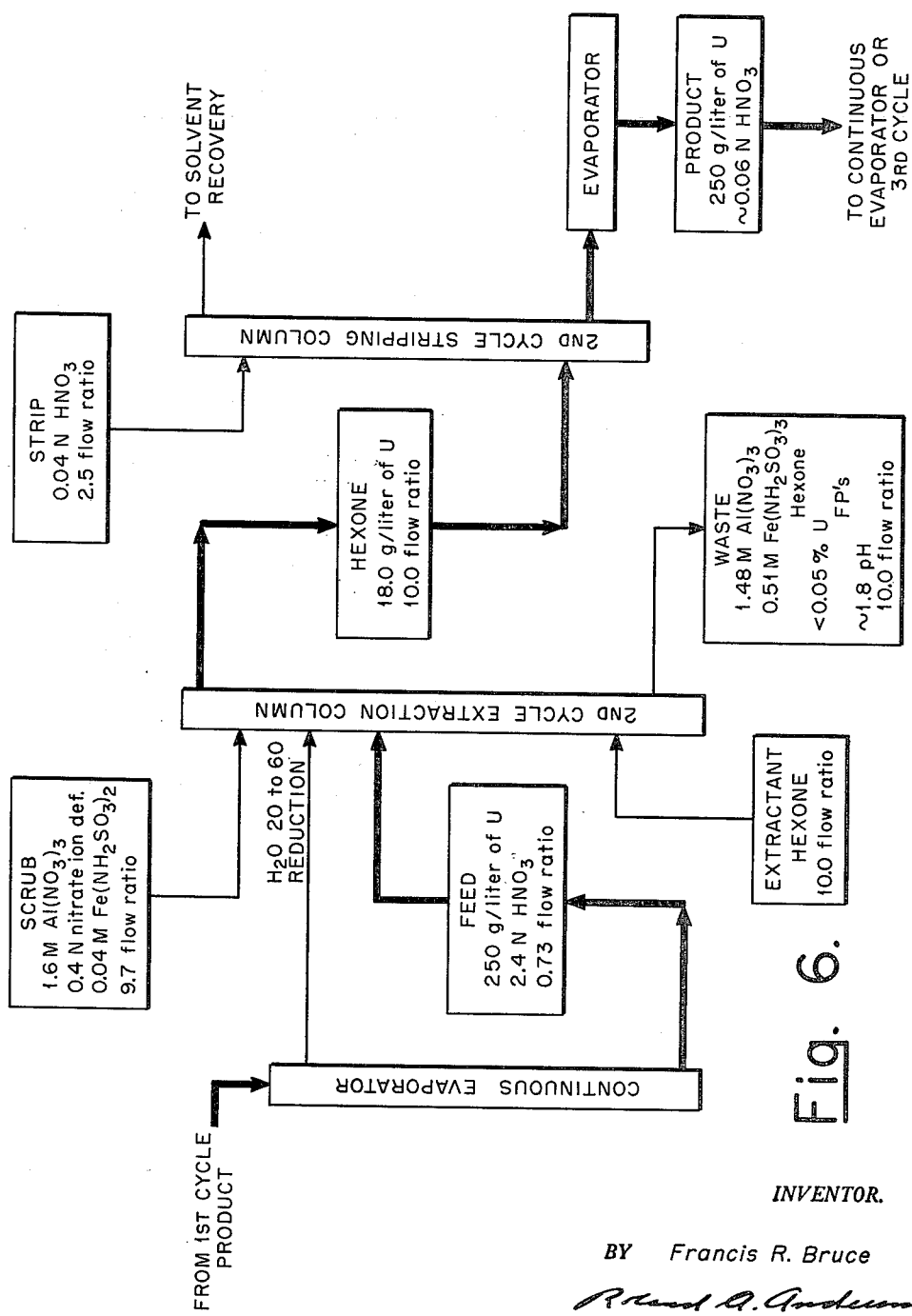

This example is intended to show a large scale production run from the recovery of uranium from highly enriched, neutron irradiated uranium. No plutonium recovery was attempted, in view of the trace quantities present in the enriched material. The procedure outlined in the flowsheets in FIGS. 5 and 6 was exactly followed. The uranium recovery exceeded 99.9%. Table II below shows the decontamination factors achieved.

*Table II*

DECONTAMINATION FACTORS

| Constituent | log D. F. | | |
|---|---|---|---|
| | 1st Cycle | 2nd Cycle | Over-all |
| Gross alpha | 4.04 | 2.41 | 6.45 |
| Gross beta | 3.84 | 2.36 | 6.20 |
| Zr | 4.43 | 3.04 | 7.47 |
| Nb | 4.04 | 3.58 | 7.62 |
| Ce | 4.60 | 3.99 | 8.59 |
| Ru | 2.55 | 2.49 | 5.04 |
| Pu | 1.30 | 1.95 | 3.25 |

EXAMPLE III

For examples of a process for the separation of protactinium, thorium and uranium from neutron irradiated uranium, reference is made to the examples in the previously identified co-pending application of the common assignee of Gresky et al.

Although the above are examples of specific nitrate ion deficient solvent extraction processes, the tremendous improvement in decontamination factors in changing to my nitrate ion deficient conditions is strikingly shown over a range of values in the nomogram in FIG. 2. It can be seen that orders of magnitude are involved. The same values hold for all uranium concentrations, and similar improvement in beta decontamination, not shown, have been obtained.

The above examples are only illustrative and should not be construed as limiting the scope of my invention.

It can be seen from these examples, however, that my invention is of great versatility and is inherently of wide applicability. Therefore, my invention is understood to be limited only as is indicated by the appended claims.

Having thus described my invention, I claim:

1. An improved process for separating uranium and plutonium from an acidic aqueous solution of neutron-irradiated uranium containing same together with fission products and nitrate ions, which comprises securing plutonium in its hexapositive state, contacting the resulting feed solution, under net nitrate ion deficient conditions, with an inert, substantially water-immiscible organic solvent, scrubbing the resulting uranium and plutonium-containing organic phase with an aqueous solution of aluminum nitrate, separating the scrubbed organic phase from the resulting fission products-containing aqueous phase, contacting the separated organic phase with an aqueous nitric acid solution containing a plutonium reductant, separating the resulting reduced plutonium-containing aqueous phase from the resulting uranium containing organic phase.

2. The method of claim 1 wherein said feed solution and the aqueous aluminum nitrate scrub solution are each approximately 0.05–0.5 normal nitrate ion deficient.

3. An improved process for recovering uranium and plutonium from an acidic aqueous solution of neutron-irradiated uranium containing same together with fission products and nitrate ions, which comprises adjusting said solution to approximately 1.0–4.0 molar uranyl nitrate, 0.025–0.3 molar dichromate ion, and 0.05–0.5 normal nitrate ion deficiency, contacting the resulting feed solution with hexone, scrubbing the resulting uranium and plutonium containing organic phase with an aqueous approximately 0.05–0.5 normal nitrate ion deficient aluminum nitrate solution, separating the scrubbed uranium and plutonium containing organic phase from the resulting fission products-containing aqueous phase, contacting the separated organic phase with an aqueous, approximately 0.025–0.1 molar ferrous sulfamate solution, scrubbing the resulting plutonium-containing aqueous phase with acidified hexone, separating the resulting uranium-containing organic phase from the resulting scrubbed plutonium-containing aqueous phase, contacting the separated organic phase with an aqueous nitric acid solution less than approximately one normal in nitric acid, thereby stripping said uranium from said organic phase.

4. The method of claim 3 wherein said feed solution is adjusted to approximately 2.0 molar uranyl nitrate, 0.1 molar sodium dichromate and 0.2 normal nitrate ion deficiency; said aluminum nitrate scrub solution is approximately 1.8 molar aluminum nitrate and approximately 0.2 normal nitrate ion deficient; said aqueous plutonium stripping solution is approximately 0.05 molar ferrous sulfamate and 1.5 molar aluminum nitrate and said hexone scrubbing reagent is approximately 0.05 normal in nitric acid; and wherein said aqueous uranium stripping reagent is approximately 0.04 normal in nitric acid.

5. A process for recovering uranium from an acidic aqueous solution of neutron irradiated uranium containing same together with fission products and nitrate ions which comprises adjusting said solution to approximately 0.5–4 grams per liter of uranium, 0.5–3.0 molar aluminum nitrate, and 0.05–0.5 normal nitrate ion deficiency; contacting the resulting feed solution with hexone, scrubbing the resulting uranium-containing organic phase with an aqueous solution approximately 0.5–3.0 molar in aluminum nitrate and 0.05–0.5 normal nitrate ion deficient, separating the scrubbed uranium-containing organic phase from the resulting fission products-containing aqueous phase, contacting the separated organic phase with an aqueous nitric solution less than approximately one normal in nitric acid, thereby stripping said uranium into the resulting aqueous uranium product stream.

6. The method of claim 5 wherein said uranium product stream is subjected to a second solvent extraction cycle, comprising adjusting said stream to approximately 150–300 grams uranium per liter and 2–3 normal nitric acid, contacting the resulting feed solution with hexone, scrubbing the resulting uranium containing organic phase with an aqueous solution of approximate composition 0.5–3.0 molar aluminum nitrate, 0.05 molar ferrous sulfamate, and 0.3–0.5 normal nitrate ion deficient, separating the scrubbed uranium-containing organic phase from the resulting aqueous phase, and then stripping the separated organic phase with an aqueous solution approximately 0.05 normal in nitric acid.

References Cited in the file of this patent

UNITED STATES PATENTS 2,227,833     Hixson et al. _____ Jan. 7, 1941

OTHER REFERENCES

Flagg et al.: Scientific American, vol. 187, No. 1, July 1952, pp. 62–67, particularly pp. 65–66.

Proceedings of the International Conference on the Peaceful Uses of Atomic Energy, held in Geneva Aug. 8–20, 1955, vol. 9, pp. 484–491; pub. by United Nations, 1956.